Jan. 24, 1939.   T. E. MOODIE   2,144,889
VEHICLE SUPPORTING STRUCTURE
Filed Dec. 3, 1936   5 Sheets-Sheet 2

INVENTOR.
T. EDWARD MOODIE.
BY
ATTORNEY.

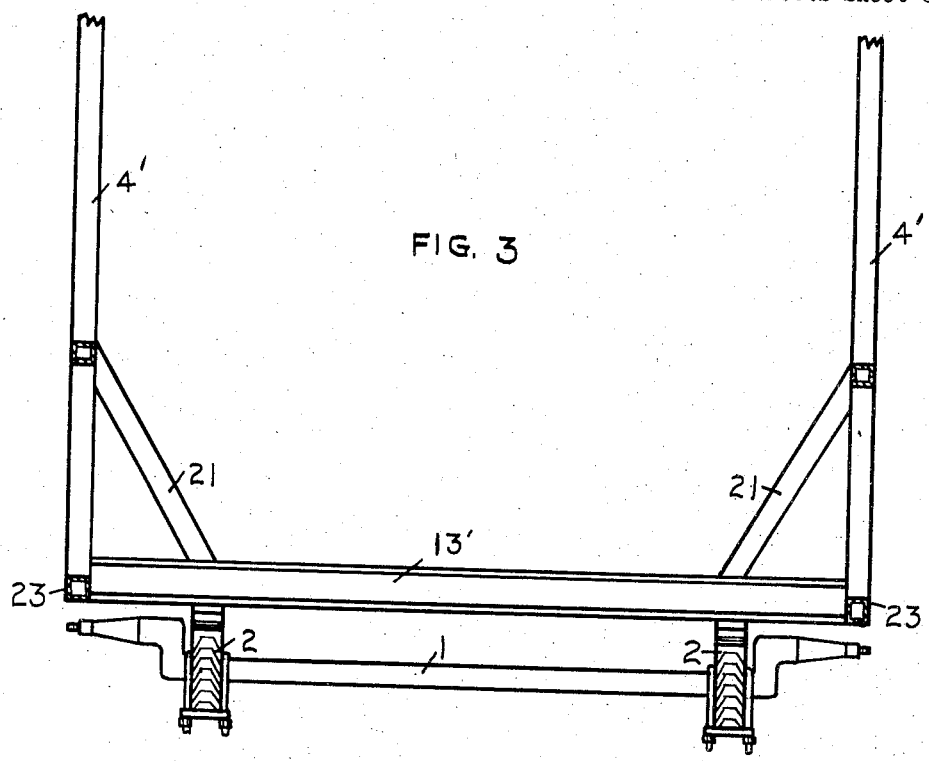
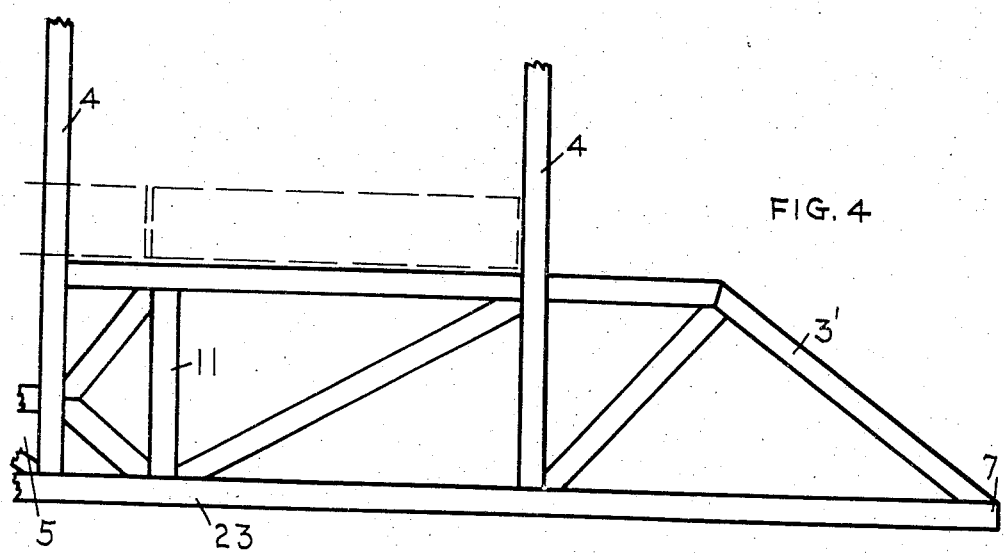

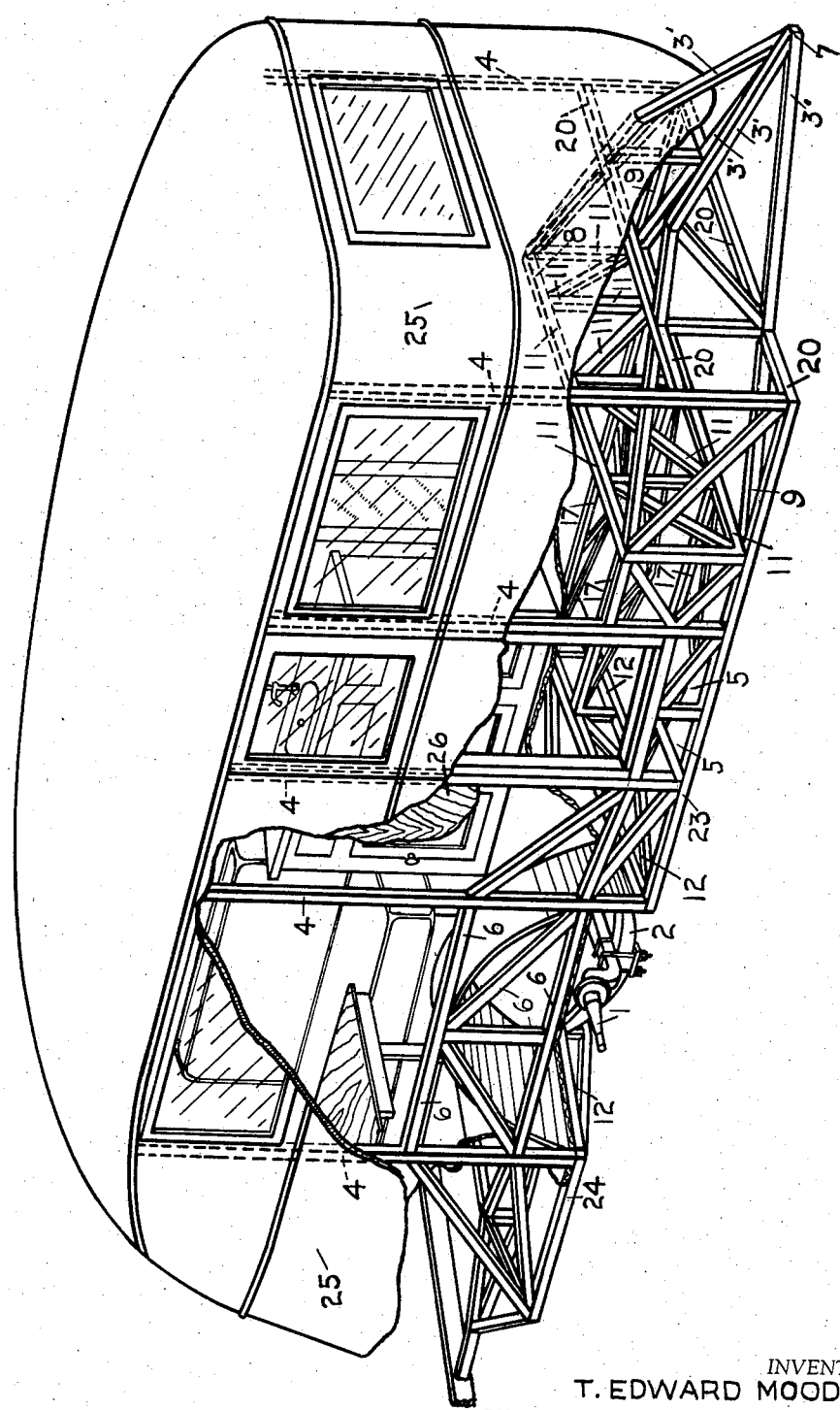

Patented Jan. 24, 1939

2,144,889

UNITED STATES PATENT OFFICE 2,144,889

VEHICLE SUPPORTING STRUCTURE

T. Edward Moodie, Atlanta, Ga., assignor to M. A. Ferst, Ltd., Atlanta, Ga.

Application December 3, 1936, Serial No. 114,017

3 Claims. (Cl. 296—28)

Purpose

The purpose of this invention is to provide a structural frame for a trailer or similar vehicle, which possesses unusual strength, rigidity, and lightness and which is concealed entirely within the side walls of the vehicle so that the floor of said vehicle can be low to the ground and the interior space can be free of all structural members.

Present practice

It has been the practice in the past to fabricate the structural frame of a trailer or similar vehicle in one of the following ways, viz., a plurality of parallel, longitudinal sills, usually two of moderate depth, are placed under the body of the vehicle and cross beams are placed on these sills and in most cases, extend beyond them slightly. A floor is then placed over these cross beams and the body enclosure is built on this floor. It will be readily seen that with this form of construction, certain serious difficulties are bound to develop, viz., the longitudinal sills, as well as the cross beams must be relatively shallow in order to prevent the body from being raised to an extreme height. As a result, this form of construction always produces a heavy and cumbersome vehicle. In case, however, deep longitudinal sills are used, the cross beams must still be laid on these sills and such a form of construction places the floor of the machine very high above the ground, which results in a top-heavy vehicle.

In order to avoid the difficulties above enumerated, the longitudinal sills are sometimes placed inside the body of the vehicle above the floor level and the cross beams are placed below the sills and below the floor, but attached to the sills by suspension bolts or similar attachments. This form of construction lowers the floor level somewhat but does not affect the weight at all and has an additional disadvantage due to the fact that the floor space is obstructed or a portion of the floor along the sides of the vehicle is raised to a higher level resulting in a loss of cubage in the vehicle without any compensating advantage.

In addition to these forms of construction, a third form of construction is sometimes used, which consists essentially of a relatively large number of shallow, heavy, longitudinal sills so disposed that the floor of the vehicle can be placed directly upon them without the use of any form of cross members. This form of construction gives a clear floor space, but is exceedingly heavy and does not lower the floor level materially.

Object of invention

This invention has for its primary objectives:

I. The formation of structural means of very light weight, adapted to carry a single load into a pair of side wall trusses displaced a considerable distance from each other.

II. The formation of a plurality of side wall trusses of very light weight, suitable for enclosure in the thin outer walls of a vehicle, but adapted to carry a large load.

III. The formation of a very shallow truss, as a unit of one of the side wall trusses, which is adapted to carry the imposed loads under the entrance door.

IV. The formation of means to carry the reaction from the spring hangers into the side wall trusses, said means being either shallow trusses or members in bending, but in all cases, to be sufficiently shallow so as to not unduly raise the floor level of the vehicle of which they are a part.

V. The formation of lightweight means to transfer the passenger and/or cargo load onto the side wall trusses, said means being either shallow trusses or members in bending, but in all cases to be sufficiently shallow so as to not unduly raise the floor level of the vehicle of which they are a part.

VI. The formation of means to carry the load of the side walls and the roof onto the side wall trusses.

Description

In this invention, both the longitudinal and cross beams are omitted and the entire loads are carried by a plurality of deep trusses (the lightest known form of structure to carry a given load) concealed in the side walls of the vehicle. These trusses are preferably fabricated of round or square steel tubing, but they may, if desired, be fabricated of channels, U-shapes, I beams, or other well known structural forms.

In addition to acting as main structural members, certain members of the truss frames just referred to, are extended sufficiently so that they can support the roof of the vehicle and form guides or supports, for the doors, windows and other objects.

Referring now to the drawings in which like characters of reference refer to like parts throughout the separate views:

Fig. 3 is a sectional end view looking toward the rear, showing in this case, a beam form of cross member for supporting the spring hangers and showing also a diagonal strut for bracing the side walls. This section is taken along the line 3—3, Fig. 2.

Fig. 4 is a side view of the forward part of the invention, showing one method of bringing the single central supporting load from the hitch into the side wall trusses. In this view, a portion of the structure designed to carry the load under the door, is shown and the forward bed or davenport is shown in dotted lines, resting on certain of the cross members.

Fig. 5 is a perspective view of the preferred form of the invention, showing in this case, in broken away form, both the exterior and interior covering of the vehicle and also showing certain items of the interior equipment. In this view, the structural elements are shown as square metal tubing which makes the most practical form of section for a light weight structure.

Figure 1:
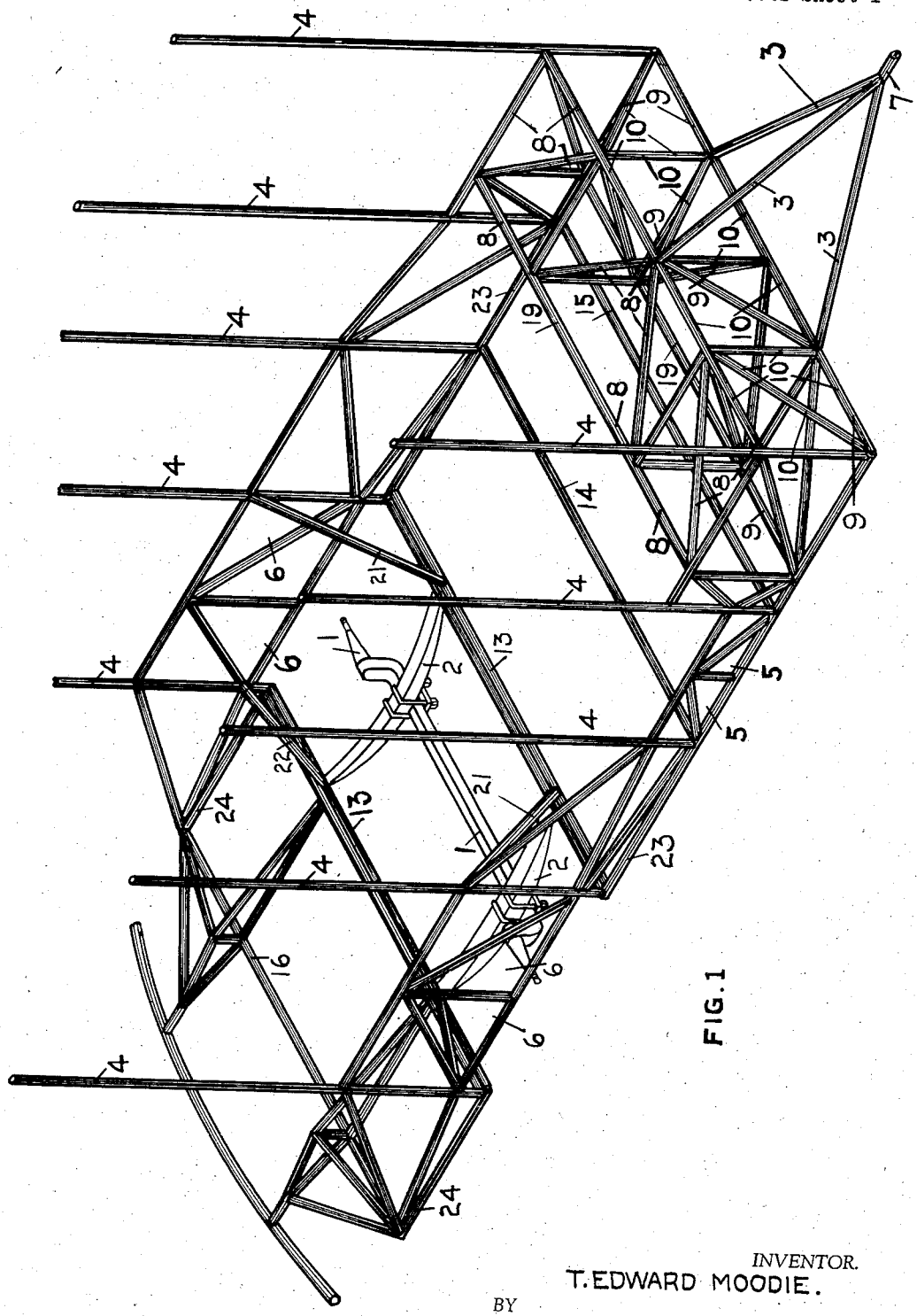
Fig. 1 is a perspective view showing one form of the invention.

Referring now to the reference numerals, 1, is the supporting axle and 2, refers to the springs. The tripod of struts, which extend out of the front of the body (Fig. 1) and which carry the forward supporting load into the side wall trusses, is given the numeral 3. When a quadrapod of struts is used, such as is shown in Figs. 2, 4, 5 and 6, the numeral 3' will be used. The vertical members, which form elements of the truss work and also serve to support the roof, are referred to by the numeral 4. The truss work, under the doors, is given the numeral 5, and the truss frames opposite the wheels, are given the numeral 6.

Considering the structure shown in Fig. 1, particularly, the principle of construction will be explained. As is well known, the forward part of a trailer is practically always supported at a single central point, such as 7. The load at this point is, in my invention, carried through the tripod or quadrapod of tubes 3 or 3', into the side wall trusses. In this connection, it might be well to note that the structure 3 or 3' could be entirely replaced by two members extending out from the lower portion of the structural frame without, in any way, departing from the spirit of the invention. If such a construction were used, the two members referred to would have to be quite heavy as they would be in pure bending, some weight might be saved, however, in the forward cross structure if this type of construction were used.

Construction

Considering item I, the single hitch supporting load which is applied at the point 7, may be carried into the two main side wall trusses either by a tripod of struts 3, Fig. 1, or a quadrapod of struts 3', Figs. 2, 4, 5 and 6. The load from those pyramidal structures may be transferred into the side wall trusses by a plurality of beams (or trusses) designed to take bending, such as the two horizontal truss frames 8 and 9, Fig. 1, in which case the struts forming the pyramidal structure 3, need not actually extend into the plane of the side wall trusses.

Figure 2:
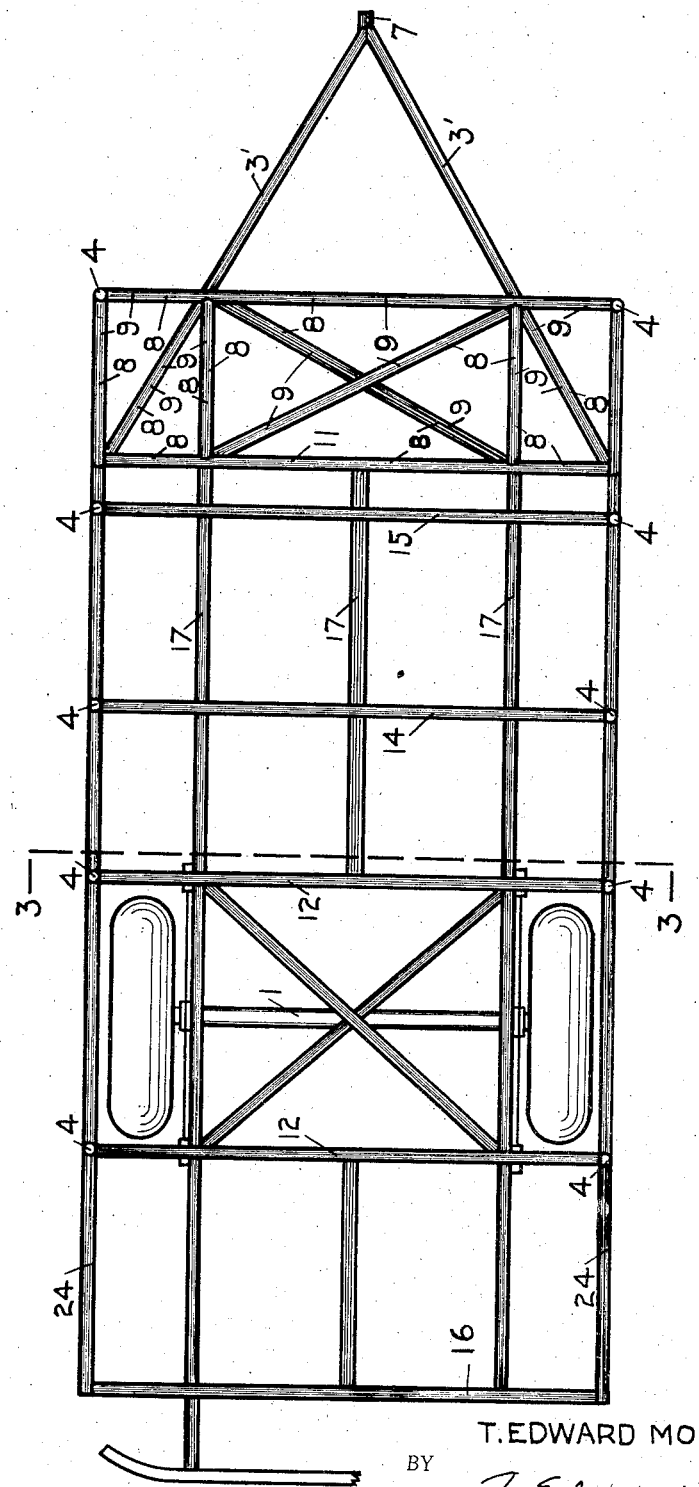
Fig. 2 is a plan view of a modified form of the invention.
Figure 6:
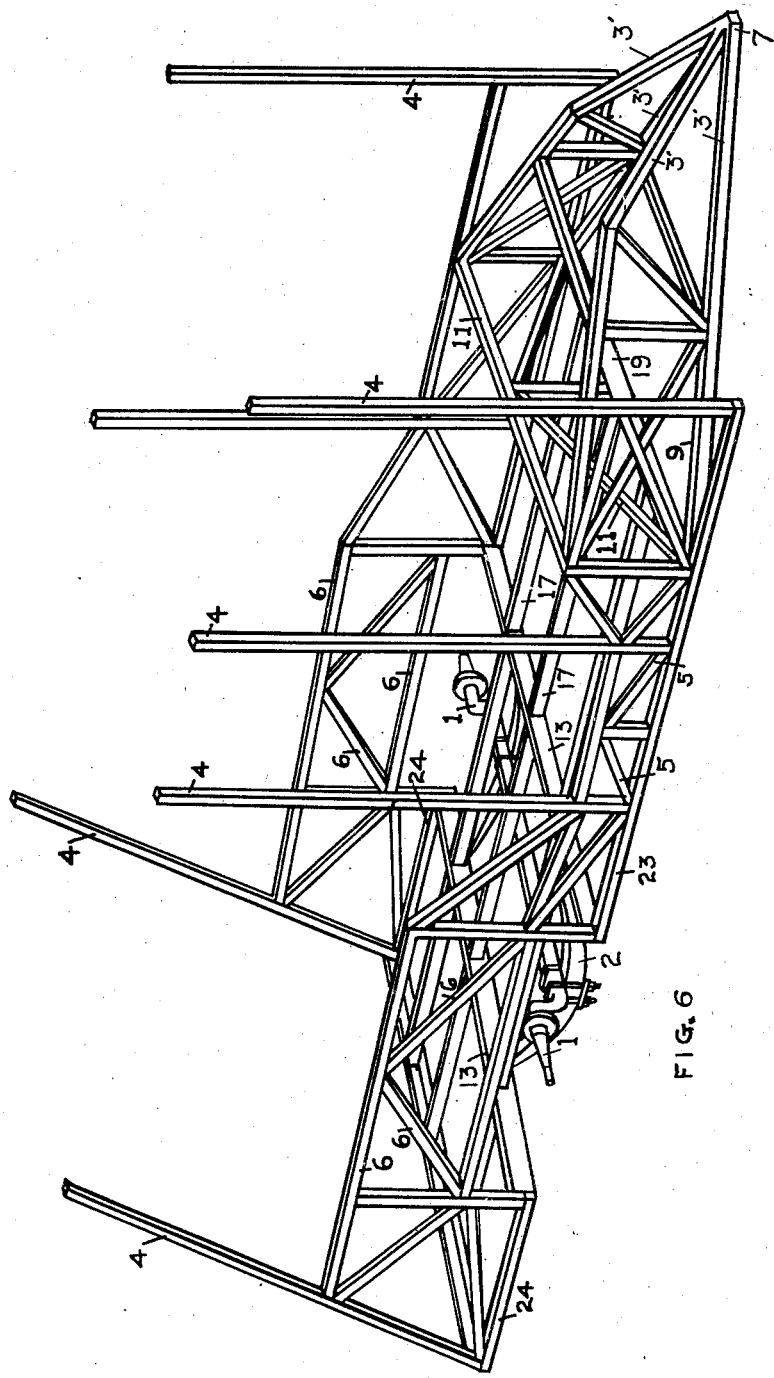
Fig. 6 is a perspective view of a preferred form of the invention showing in particular, a quadrapod type of hitch truss whch transfers the hitch load directly into the side wall trusses without carrying said load through any system of trusses or beams designed to take bending in a horizontal plane.

In certain cases, instead of transferring the loads from the pyramidal members 3 or 3', as the case may be, onto horizontally disposed lower cross trusses such as 8, Figures 1 and 2, and upper cross trusses such as 9, Figures 1 and 2. The pyramidal structure, in this case a quadrapod such as 3', Figures 5 and 6, or a plurality of members in pure bending (not shown), is extended until it intersects the plane containing the side wall trusses even though such intersections should occur aft of the forward point of said side wall trusses. In this manner, the moments due to the load imposed at 7, are carried directly into the side wall trusses and do not go through a plurality of intermediate beams or trusses adapted to take horizontal bending. In either case, the shear due to the applied load at the point 7, must be taken either by a single beam member in vertical bending (not shown) or a vertically disposed truss, such as 10, Fig. 1, or 11, Figs. 2, 4, 5 and 6. Having now carried the single centrally applied hitch load into the side wall trusses consideration may be given to the absorption of the load in these trusses as referred to under item II.

The design of the side wall trusses is such that the features, listed under items II, III and VI, are obtained. Due to the presence of a door on the right side of most of the conventional forms of house trailers, it is necessary that a shallow truss be placed under this door to carry the load through this section of the structure. Such a truss is shown in Figs. 1 and 5, and is referred to by the numeral 5. This part of the structure is a conventional truss, although quite shallow and must be connected to true triangular truss frames at each end. The structure opposite the wheels in both of the side wall trusses, is in the form of a simple truss comprising verticals, diagonals, and chord members, all symmetrically disposed. In order that the roof and side wall loads may be adequately supported, the vertical member 4 of the side wall trusses, are extended above the truss frames as unbraced columns and are so disposed that the roof and also certain portions of the side and end walls, and in some cases, the windows, door, etc., may be attached directly to them. In this manner, practically all of the roof and side wall loads are transferred directly to the side wall truss frames, and the effect specified under item VI is obtained.

Referring now to the item IV, it will be noted that the spring hangers are located at a point well inboard from the side wall truss frames. The reactions from these hangers, which in reality support the rear part of the vehicle and are therefore quite large, must be carried into the side wall trusses.

In Fig. 5, a plurality of shallow trusses 12, are used to make this transfer of loads. In Fig. 1, a double beam member 13, is used, and in Fig. 3, a channel beam 13' is used. These trusses or members (one directly behind the other) may be seen to better advantage by referring to Figs. 2 and 3. In certain cases, it may be found desirable not to use trusses to transfer the load from the spring hangers onto the side wall truss frames and in this case, a heavy member, designed to take a large bending load, is used for this purpose. Such a construction is shown in Figs. 1 and 3, where these members are referred to by the numerals 13 and 13'.

Item V refers to the method of transferring the load of the passengers and/or cargo onto the side wall truss frames. This may be accomplished directly by means of transverse members adapted to take bending, such as the members 14, 15 and 16, Figs. 1 and 2, or by means of vertically disposed shallow trusses located at the same points as these members.

In all cases, it should be noted that these members (or trusses) are attached to panel point locations on both side wall trusses. In certain cases, it may be found desirable to transfer part of the passenger and/or cargo load first to one or more of the main cross trusses or beams, such as the main cross truss near the front of the vehicle and one of the auxiliary cross trusses or beams designed to carry the spring load and thence to the side wall trusses and such a form of construction is indicated by the truss frames 17, Figs. 2 and 5. These frames could, of course, be replaced by single members of sufficient strength to take the applied loads in pure bending.

In regard to item VII, it will be seen that the cross truss or shear truss 11, Fig. 5, or 10, Fig. 1, located near the front of the vehicle, gives considerable rigidity to the side wall trusses. This cross bracing truss, together with the auxiliary cross members 19, Fig. 1, or 20, Fig. 5, and the diagonal struts 21 and 22, Fig. 1, all act to form a plurality of side wall trusses possessing such a degree of transverse rigidity that the vehicle can retain its shape without appreciable help from the roof bows.

Summary

Summarizing, it will be seen that by the unique combination of a number of truss frames that a structure of unusual rigidity, compactness, strength and light weight, has been obtained. This structure comprises 1. A plurality of side wall trusses including vertical, diagonal, and chord members adapted for concealment entirely within the side walls of a vehicle and modified so as to permit the removal of the wheels and the insertion of a door and windows. Certain vertically disposed members of this truss are extended beyond the confines of the truss and serve to carry the load of the roof down to the truss and at the same time, impart transverse rigidity to the roof.

2. A plurality of cross trusses or beams adapted to carry the wheel or spring loads into the side wall trusses above referred to.

3. A cross truss adapted to give transverse rigidity to the side wall trusses and also to carry the vertical component of the single forward supporting load into the side wall trusses.

4. A hitch truss or pyramidal truss or a plurality of members in bending adapted to carry the load from the hitch into the cross or shear truss, referred to under 4 above, and thence into the side wall trusses, or in some cases, directly into the side wall trusses.

5. A plurality of beams and/or trusses adapted to carry the weight of the passengers and/or cargo either directly to the side wall trusses, or directly to the cross trusses and/or beams and thence to the side wall trusses.

6. A method such as welding or riveting for fastening the combination of trusses together and a method of applying suitable covering material to both the exterior and the interior of the structure thus formed.

Claims

It will be seen by reference to this specification and to the accompanying drawings that I have evolved a novel and useful structure combining to an unusual degree, strength, rigidity and lightness.

Having thus described my invention, what I claim is:

1. A trailer frame structure comprising a right side truss frame and including a door opening and a shallow truss below said door opening and including a truss aft of said door opening said truss having its upper and lower chord members above the upper and lower chord members of the balance of the truss frame, a left side truss frame parallel to said right side truss frame and similar to said right side truss frame but without a door opening, a forwardly located cross truss adapted to connect oppositely disposed vertical members of the right and left side truss frames and a plurality of trusses disposed in intersecting planes and adapted to form a junction with said right and left side truss frames in the plane of said cross truss and aft of the forward end of said right and left side truss frames thereby forming means for transferring a single concentrated load into said right and left side truss frames without, however, causing a sidewise distortion of said truss frames.

2. A trailer frame structure comprising a right side truss frame and a door opening in said truss frame and including a truss aft of said door opening, said truss having its upper and lower chord members above the upper and lower chord members of the balance of the truss frame, a left side truss frame parallel to said right side truss frame, a forwardly located cross truss adapted to connect oppositely disposed vertical members of the right and left side truss frames and a plurality of trusses disposed in intersecting planes and adapted to form a junction with said right and left side truss frames in the plane of said cross truss and aft of the forward end of said right and left side truss frames thereby forming means for transferring a single concentrated load into said right and left side truss frames without, however, causing a sidewise distortion of said truss frames.

3. A trailer frame structure comprising a right side truss frame and a left side truss frame parallel to said right side truss frame and similar to said right side truss frame, a forwardly located cross truss adapted to connect oppositely disposed vertical members of the right and left side truss frames and a plurality of trusses disposed in intersecting planes and adapted to form a junction with said right and left side truss frames in the plane of said cross truss and aft of the forward end of said right and left side truss frames, thereby forming means for transferring a single concentrated load into said right and left side truss frames without, however, causing a sidewise distortion of said truss frames.

T. EDWARD MOODIE.